United States Patent
Sammons et al.

(10) Patent No.: US 6,809,293 B2
(45) Date of Patent: Oct. 26, 2004

(54) CONTROLLED OUTPUT FOR WELDING

(75) Inventors: Michael Sammons, Appleton, WI (US); Stephen Ferkel, Appleton, WI (US); Albert DeCoster, Kaukauna, WI (US); Mark Kadlec, Shiocton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/397,549

(22) Filed: Mar. 25, 2003

(65) Prior Publication Data

US 2003/0155338 A1 Aug. 21, 2003

Related U.S. Application Data

(63) Continuation of application No. 09/827,020, filed on Apr. 5, 2001, now Pat. No. 6,548,784.

(51) Int. Cl.$^7$ ................................................. B23K 9/10
(52) U.S. Cl. ............. 219/132; 219/130.21; 219/130.31
(58) Field of Search ........................... 219/132, 130.21, 219/130.31, 130.32, 130.33, 137 PS

(56) References Cited

U.S. PATENT DOCUMENTS

| | | | | |
|---|---|---|---|---|
| 2,617,913 A | * | 11/1952 | Oestreicher | ................. 219/132 |
| 4,044,413 A | * | 8/1977 | Tucker | |
| 4,100,390 A | * | 7/1978 | Jackson | ...................... 219/132 |
| 4,435,631 A | * | 3/1984 | Drouet et al. | |
| 4,450,340 A | * | 5/1984 | Corrigall et al. | ............. 219/132 |
| 4,514,615 A | * | 4/1985 | Simoneau et al. | .......... 219/132 |
| 4,570,842 A | * | 2/1986 | Gregorious et al. | |
| 4,766,286 A | * | 8/1988 | Iceland | .................... 219/130.4 |
| 4,943,701 A | * | 7/1990 | Nakajima et al. | |
| 5,245,546 A | * | 9/1993 | Iceland | ................... 219/130.33 |
| 5,308,952 A | * | 5/1994 | Bunker et al. | ........... 219/130.4 |
| 5,343,016 A | * | 8/1994 | Davis et al. | .............. 219/130.4 |
| 5,513,093 A | * | 4/1996 | Corrigall | |
| 5,714,731 A | * | 2/1998 | Ulrich et al. | ............. 219/130.4 |
| 6,034,350 A | * | 3/2000 | Heraly et al. | .......... 219/130.31 |
| 6,115,051 A | * | 9/2000 | Simons et al. | |
| 6,115,273 A | * | 9/2000 | Geissler | |
| 6,156,998 A | * | 12/2000 | Takahashi et al. | ..... 219/130.21 |
| 6,548,784 B2 | * | 4/2003 | Sammons et al. | .......... 219/132 |

OTHER PUBLICATIONS

Miller The Power of Blue Millermatic® 250X And M–25 Gun.

* cited by examiner

Primary Examiner—Clifford C. Shaw
(74) Attorney, Agent, or Firm—George R. Corrigan

(57) ABSTRACT

A method and apparatus for welding is disclosed. It includes a source of power and a controller. An output feedback circuit provides feedback to the controller. The controller includes a comparator that compares the fedback signal to a threshold and/or detects a short on the output. A standby/welding control is responsive to the comparator. Also, an arc end control may be provided that terminates the arc in response to detecting an increase in arc length.

21 Claims, 3 Drawing Sheets

CONTROLLED OUTPUT FOR WELDING

RELATED APPLICATION

This is a continuation of application Ser. No. 09/827020, filed on Apr. 5, 2001, which issued as U.S. Pat. No. 6,548,784.

FIELD OF THE INVENTION

The present invention relates generally to the art of welding. More specifically, it relates to providing a reduced OCV and for terminating the arc at the end of a weld.

BACKGROUND OF THE INVENTION

There are a number of different welding processes. Two known welding processes are stick welding and TIG. Each welding process has its own characteristics, objectives and problems that often make it difficult to adapt a control scheme from one process to be used with another process.

Stick welding (also called SMAW or Shielded Metal Arc Welding) is an arc welding process which uses a consumable stick electrode, and may be performed using an ac or a dc output. The stick welding process is often touch or scratch started, wherein 80 volts (typically) is the open circuit voltage (OCV). The user scratches or touches the electrode to the workpiece and the OCV causes current to flow. The user pulls the electrode away from the workpiece, drawing an arc therebetween. This starting process may be adequate for skilled welders, but is often difficult for less experienced welders. Also, 80 volts OCV may be sufficient for a user to feel an electric shock if they touch the electrode and the workpiece, or the output studs of the power supply. While this might not injure the worker, it can result in downtime while the worker receives attention making sure they are not injured, and/or the power supply is serviced.

Tungsten-inert gas (TIG) welding is a welding process where a tungsten electrode is used, and the electrode does not become part of the completed weld. One known way of starting the TIG welding process is the Miller LiftArc®, which provides a reduced OCV in a standby state, and then monitors the output to detect a short-circuit between the electrode and the workpiece. A detected short (which occurs when the user touches the electrode to the workpiece) indicates the users intent to start the weld. The power supply then enters a preheating state, where a low current is provided to heat the electrode. After the electrode is heated the user needs to lift the electrode away from the workpiece a second time to cause the power supply to enters a welding state where the desired welding current is provided. Such a starting scheme will not function properly in stick welding because the stick will adhere to the workpiece after preheating.

Accordingly, a welding power supply that allows for easy starting of a stick welding process, yet provides for a reduced OCV when not welding is desirable. Also, the power supply should provide a start that does not cause the electrode to adhere to the workpiece.

Other problems occur when the arc welding process is terminated. The simplest way to terminate a weld is to pull the electrode away from the workpiece, drawing a longer arc. The machine output voltage increases, in an attempt to maintain the arc. Eventually, the arc length is so great that the power supply cannot provide voltage sufficient to maintain the arc, and the arc is extinguished. One problem with terminating the arc in this fashion is that when the arc is relatively long it has a tendency to whip across the surface of the workpiece, leaving undesired weld tracks. This problem is particularly prevalent in ending a TIG process.

Another known way to terminate a welding process is to provide a remote switch that the user can reach while welding. The switch terminates the weld process abruptly. It is remote so that the user can access it without taking his attention from the arc, lest the arc stray across the workpiece. Unfortunately, a remote control adds cost and complexity to a welding power supply.

A known way to terminate a stick welding process is to monitor the current in an inverter in the power supply, and to terminate power when the current crosses below a threshold. However, this process is not well suited for TIG because the arc can become undesirably long before the current drops below a threshold that avoids false detection of the end of the arc. Thus, the arc can whip across the workpiece.

Accordingly, a welding power supply that ends a TIG welding process easily, cleanly, and without adding excess cost is desirable.

SUMMARY OF THE PRESENT INVENTION

According to a first aspect of the invention a welding power supply includes a source of power and a controller. An output feedback circuit provides feedback to the controller. The controller includes a comparator that compares the fedback signal to a threshold. A standby/welding control is responsive to the comparator.

According to a second aspect of the invention an apparatus for starting a welding process includes an output feedback circuit and a short-circuit detect circuit, that receives the fedback signal. A controller provides a standby state output to a power supply if the electrode is not initially touching the workpiece. It provides a welding state output if the electrode subsequently touches the workpiece.

According to a third aspect of the invention a welding power supply includes a source of power and a controller for the source of power. An output feedback circuit provides feedback to the controller, The controller includes a comparator that receives a signal indicative of a threshold and the feedback signal. The controller further includes an arc end control that responds to the comparator.

The controls include at least a portion of a digital circuit, and is a microprocessor with instruction in various embodiments. The instructions control the output voltage to a first level an initial time the comparator has a first output. Then, they control the output voltage to a second level when the comparator has a second output in another embodiment. The instructions control the output of the power supply to a welding status in the event the comparator has a third output and that control the output of the power supply to an arc end status in the event the comparator has a fourth output for a period of time.

The feedback circuit includes a voltage feedback circuit and/or a current feedback circuit in alternative embodiments.

The comparator is a delay comparator in one embodiment.

According to a fourth aspect of the invention a method of providing welding power includes sensing an output parameter and comparing the sensed parameter to a threshold. A power supply is controlled to be in a standby or welding state in response to the comparison.

According to a fifth aspect of the invention a method of providing welding power includes sensing at least one output parameter and comparing it to a threshold. A power supply is controlled to be in a welding state or an arc end state in response to the comparison.

According to a sixth aspect of the invention a method of ending a welding process includes sensing an output parameter and determining if an arc length exceeds a threshold. A power supply is controlled to be in a welding state if the arc length does not exceed the threshold, or in an arc end state if the arc length does exceed the threshold.

The output voltage is controlled to a first level or a second level in response to the comparison in one alternative.

The sensed output parameter is voltage and/or current, and the comparison is output voltage and/or current to the threshold in other alternatives.

The welding state includes a first output voltage and the standby state includes terminating the output after a delay in one embodiment.

According to a seventh aspect of the invention a method of starting a welding process includes sensing an output parameter, and determining if an electrode touches a workpiece in response to the sensed parameter. A power supply is controlled to be in a standby state if the electrode is initially not touching the workpiece, and then controlled to be in a welding state if the electrode is touching the workpiece.

According to an eighth aspect of the invention an apparatus for ending a welding process includes an output feedback circuit and an arc length detect circuit. A controller provides a welding state output if the arc length is less than a threshold and provides an arc end state output if the arc length is greater than the threshold.

The welding state includes a first greater output voltage and the standby state includes a second lessor output voltage in an alternative, and controlling the output voltage to a first level or terminating the output in another alternative.

The sensed parameter is output voltage or current, which is then compared to a threshold in other alternatives.

Other principal features and advantages of the invention will become apparent to those skilled in the art upon review of the following drawings, the detailed description and the appended claims.

Figure 1:
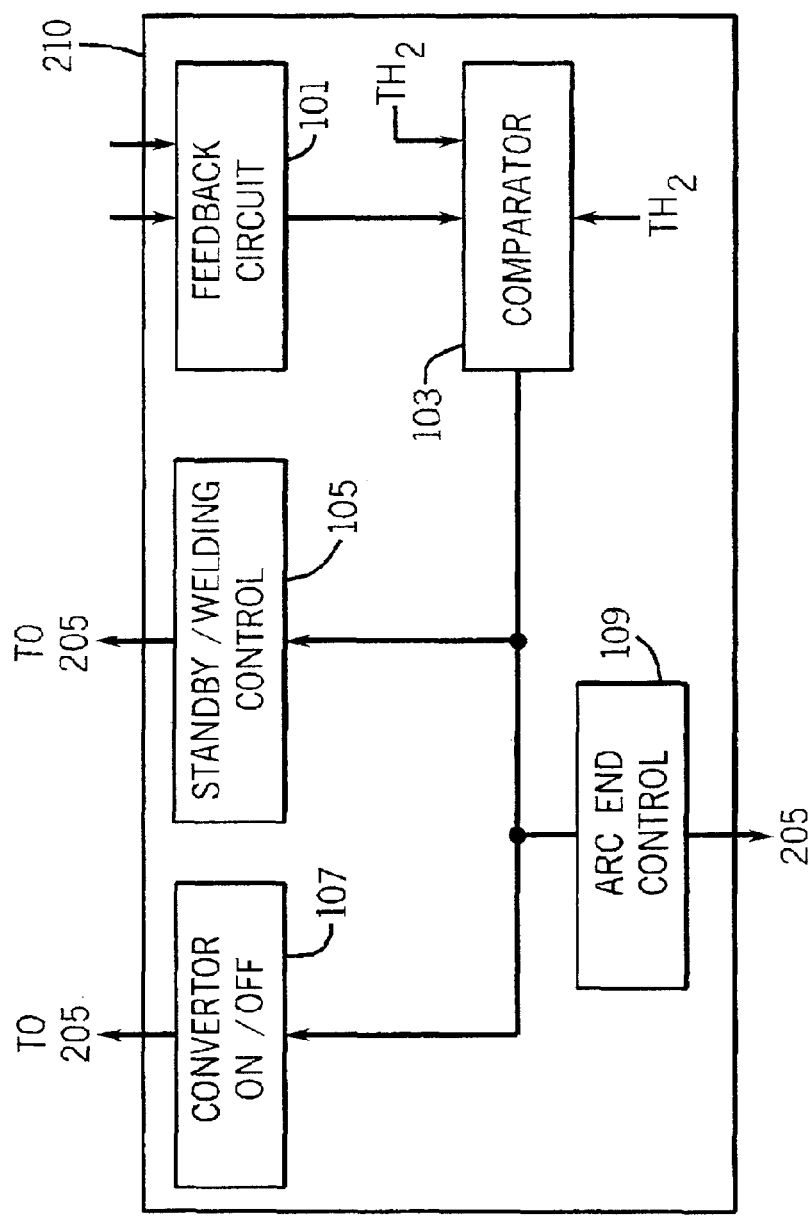
FIG. 1 is a block diagram representing functions of a controller of a welding power supply in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular power supply, using particular components, to perform a particular process, it should be understood at the outset that the invention may also be implemented with other power supplies, components and/or processes.

Generally, the invention relates to a stick welding power supply that provides a reduced output voltage and a desirable start. While it is often difficult to adopt a control scheme for one welding process to another welding process, the particular controls described herein are readily adaptable to other welding processes. The power supply is in a standby state initially, wherein a low OCV (such as 9–13V at the output studs in the preferred embodiment) is provided. The user touches the electrode to the workpiece to signal the start of the welding process. The output voltage is monitored, and when it drops below a threshold (5V in the preferred embodiment), the power supply is controlled to enter a welding state. Thus, a low OCV is provided until the user is ready to weld (and touches the electrode to the workpiece), and then the desired welding output is provided.

Standby state, as used herein, includes a state where the output voltage/and or current of the welding power supply is reduced, and/or features relating to current, power, or voltage, such as boosts or user setpoints are disabled, and/or the inverter portion of the power supply may be turned off. Welding state, as used herein, includes a state where the output voltage and/or current of the welding power supply is provided at the output set point such that welding can be performed, and/or features relating to current, power, or voltage, such as boosts or user setpoints, are enabled, and/or the inverter portion of the power supply may be turned on, and excludes a preheat state.

The preferred embodiment is implemented using a Miller Maxstar® welding power supply, and generally includes the power supply described in U.S. Pat. No. 6,115,273, issued Sep. 5, 2000, entitled Power Converter With Low Loss Switching (hereby incorporated by reference), and assigned to the owner of this invention. Another power supply that may be used to implement this invention is found in the Miller XMT 304®, and is described in U.S. patent application Ser. No. 09/540,567, filed Mar. 31, 2000, entitled Method And Apparatus For Receiving A Universal Input Voltage In A Welding, Plasma Or Heating Power Source (hereby incorporated by reference), also owned by the owner of this invention. Of course, any welding power supply could be used to implement this invention.

Figure 2:
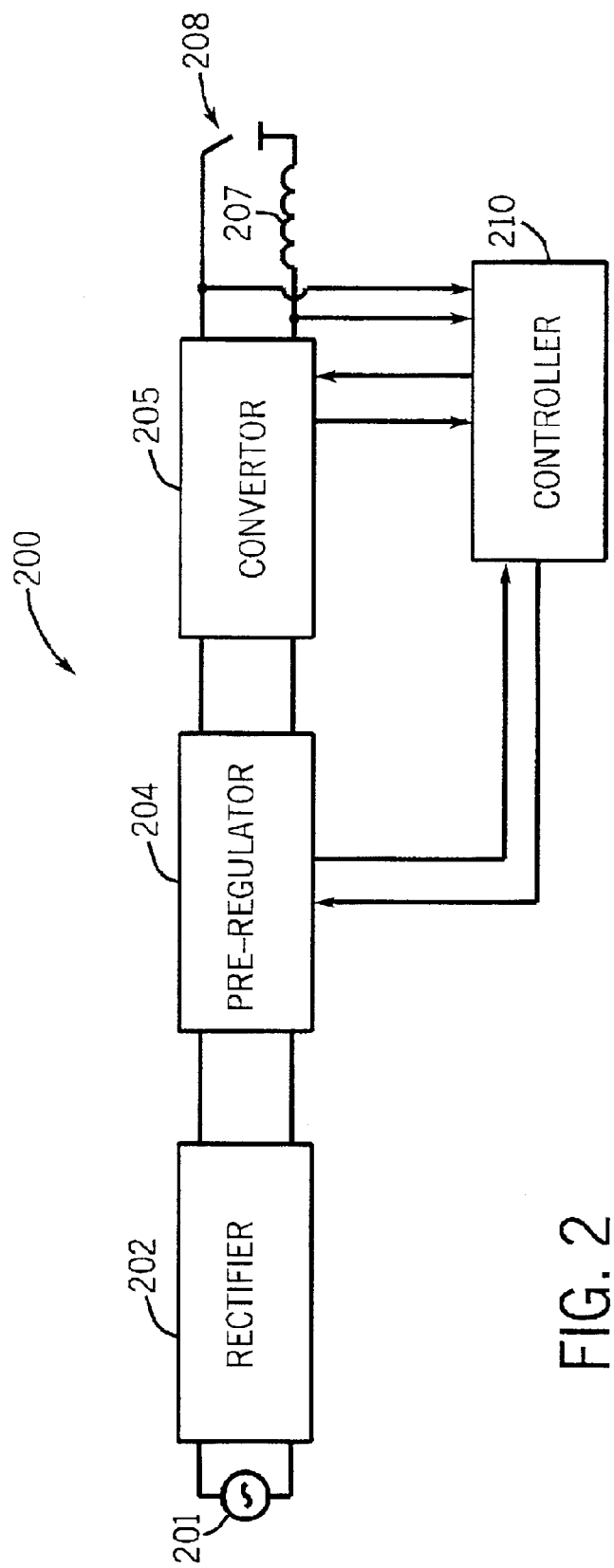
FIG. 2 is a block diagram of a welding power supply in accordance with the present invention.

A block diagram of a welding power supply constructed in accordance with the preferred embodiment is shown in FIG. 2. Source 201 represents the input voltage used to provide power to the welding power supply, and may be from a utility source, battery, generator, or other source. The input voltage is between 90 and 480 volts in the preferred embodiment, and is provided to a rectifier 202, which may be a simple bridge rectifier. The output of rectifier 202 is a rectified sinusoid. A pre-regulator 204 receives the rectified sinusoid from rectifier 102 and provides a dc bus output to an output invertor 205. Pre-regulator 204, in the preferred embodiment is a soft-switched boost convertor which provides close to a unity power factor. Other convertor or invertor configurations may be used. Convertor 205 is preferably a half-bridge, transformer isolated, soft (or slow) switched invertor. Such an output circuit will is described in detail in U.S. Pat. No. 6,115,273. Output convertor 205 is a typical forward convertor or another type of convertor in other embodiments. Other alternatives include using different power sources or power topologies, omitting the pre-regulator or the output converter, using a transformer based power supply, a phase control based power supply, or any other type of power supply. Power source, or source of power, as used herein, includes the power circuitry such as rectifiers, switches, transformers, SCRs, etc that process and provide the output power.

Controller 210 receives an output feedback signal as an input. The output feedback signal may include voltage, current, power, or functions thereof (derivatives, integrals, etc.) Controller 210 also receives signals from converter 205 and pre-regulator 204, and provides control signals thereto.

A block diagram representing some of functions of controller 210 is shown in FIG. 1. Functions not shown may be performed as they are in the prior art, or in other manners, without departing from this invention. Controller 210 includes a feedback circuit 101, a comparator 103, a standby/welding control circuit 105, and a convertor on/off control 107. Controller 210 includes a microprocessor in the preferred embodiment, and includes stored instructions (stored in flash memory, EPROM, code, software, firmware, etc.) It may be implemented using analog and/or digital circuitry, with discrete components and/or integrated circuits such as microprocessors, DSPs, etc., in alternative embodiments. Controller 210 may be located on a single board, or distributed on a plurality of boards.

Feedback circuit 101 receives an output parameter, such as current, voltage, power or functions thereof, and provides a signal responsive thereto (i.e., the signal represents the fedback parameter(s) or function(s) thereof.) Feedback circuit 101 is implemented with a microprocessor and software in the preferred embodiment, but may also be implemented with analog and/or discrete components. Feedback circuit 101 is an output feedback circuit since it receives an output parameter as the fedback signal, but can more specifically be a voltage or current feedback circuit. Feedback circuit 101 senses the output parameter because it receives a signal indicative of the parameter. Voltage is the fedback parameter in the preferred embodiment.

Feedback circuit 101 provides the feedback signal to comparator 103. Comparator 103 compares the fedback signal (voltage in the preferred embodiment) to a threshold TH1. Comparator 101 is implemented with software in the preferred embodiment, but may also be implemented with analog and/or discrete components. (Comparator, as used herein, compares two or more input values and provides an output indicating which of the input values is greater, and may be digital, analog or a combination thereof.)

The threshold is set at 5 volts in the preferred embodiment, and the standby open circuit voltage is 13 volts. Thus, when the electrode touches the workpiece the comparator output changes state (and controller 210 has determined the electrode touched the workpiece). Comparator 103 and feedback circuit 101 combine to detect shorts at the outputs, and may also be called a short-circuit detect circuit.

The-output of comparator 103 is provided to convertor on/off control 107 which sends control signals to convertor 205. If a short of the output is not detected by comparator 203 then convertor 205 is disabled, or inhibited from providing output current and voltage. (The 13 volt output for the short detect is derived from the power supply for controller 210). Conversely, if a short of the output is detected by comparator 203 then convertor 205 is enabled (preferably immediately without intervening states such as preheating), and provides the welding output selected by the user. Once the short has been detected comparator 205 is locked into a state and converter 205 is enabled until the weld is over. Thus, the standby state is provided only for the initial comparison (i.e. before the comparison changes) indicating no short.

The output of comparator 103 is also provided to a standby/welding control 105 which sends control signals to convertor 205. If a short of the output is not detected by comparator 203 then control 105 sends a standby state output control signal that causes convertor 205 to be in a standby state, and not provide the user selected output, boost, etc. Conversely, if a short of the output is detected by comparator 203 then control 105 sends a welding state output control signal that causes convertor 205 to be in a welding state, and provide the user selected output, boost, etc. Thus, controller 210 provides an output voltage control that sets the output voltage. Both of controls 105 and 107 are used, or only one or the other are used, in various embodiments.

Figure 3:
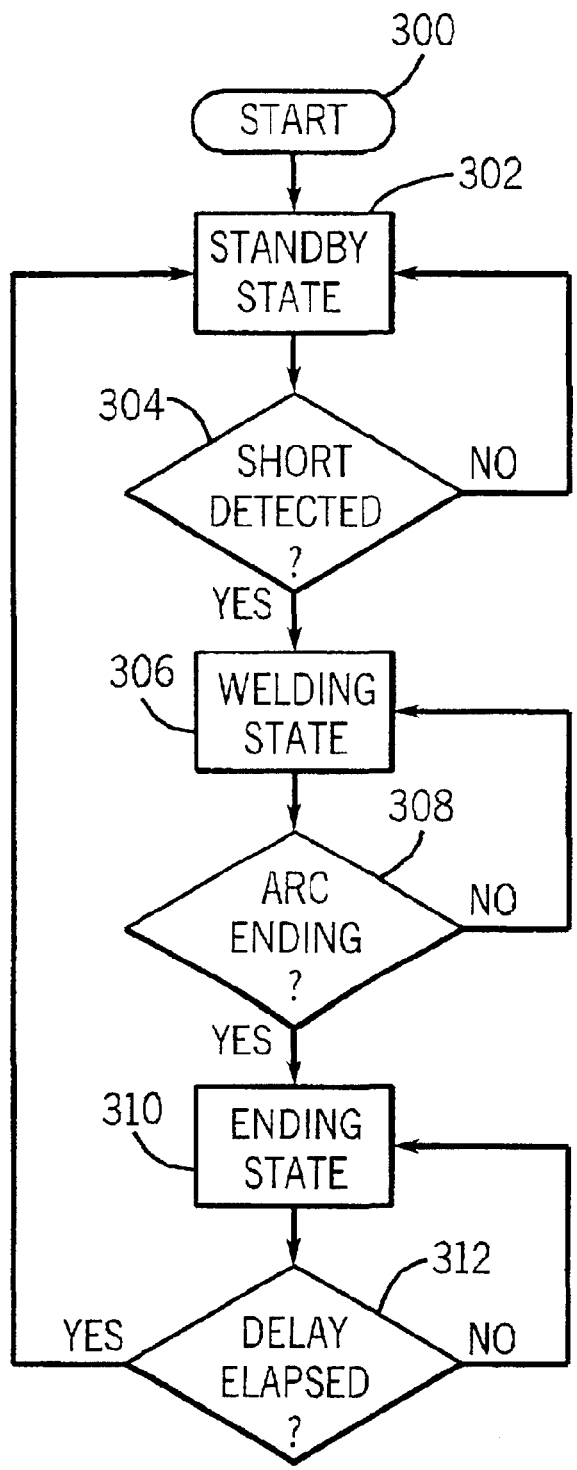
FIG. 3 is a flow chart of a welding process in accordance with the present invention.

A flow chart that implements the preferred welding process starting routine is shown in FIG. 3. The process starts at step 300, and at step 302 the power supply is controlled to be in the standby state (having a reduced OCV and the converter disabled). If a short is not detected at step 304, the process returns to step 302, and continues in the standby state.

If a short is detected at step 304 the power supply is controlled to be in the welding state at step 306, with a full OCV, and controlled in accordance with the user setpoint (i.e., fully on).

The power supply continues on in the welding state until the user desires to end the arc, by pulling the electrode away from the workpiece. A longer arc results in an increased arc voltage and/or decreased arc current. Thus, the arc current is monitored and a decreasing arc current indicates the user's intent to end the welding process. The arc voltage and/or current is compared to a threshold, and the derivative of the arc voltage and/or current is compared to a threshold in various embodiments. The arc current is compared to a threshold of 5 amps in the preferred embodiment, and a 50 msec time of less than 5 amps indicates the end of the arc. The comparison is preferably made by comparator 103, which receives current feedback and a second threshold input TH2, but may be made by other circuitry, software, etc. Comparator 103, is called a delay comparator because it requires that the threshold condition be met for a delay period of 50 msec, in the preferred embodiment.

If the arc is not detected as ending at step 308, then the process continues in the welding state at step 306. However, if the arc ending is detected at step 308, then the power supply is controlled to arc ending state 310. Arc ending state 310 generally provides for a time delay while the power supply is disabled and cannot re-enter the welding state. This prevents inadvertent re-striking of the arc by terminating the output power. The time delay is supplied by step 312, and is 200 msec in the preferred embodiment. The arc end state may be implemented with an arc end control circuit 109 (FIG. 1), which is preferably part of controller 210 and may be digital, analog, software, firmware, etc.

Step 308 is implemented with a novel control for a TIG welding process (and the novel control can be used with other processes). Generally, the TIG process is ended when the output (arc) voltage rises above a threshold, rather than when the current decreases. Specifically, in the preferred TIG embodiment, the process ends when the output voltage rises above 25 volts, and a delay of 50 msec may be used (or omitted). Then, at step 310 the arc is immediately terminated and the power supply is disabled (preferably for a period of time). The features that determine if the arc voltage has increased beyond a threshold are called an arc length detect circuit because the arc length may be inferred from the data and the voltage comparisons.

Arc end state, as used herein, includes a state where the output voltage and/or current of the welding power supply is quickly terminated (such that the arc does not whip across the work piece). It may include (but does not require) a delay before the arc can be re-struck.

The process returns to step 310 (the arc end state with full output) until it is determined at step 312 that the desired delay has elapsed. After-the delay has elapsed the process returns to the standby state at step 302, where the converter output is disabled, and the arc extinguishes. Thus, the welding process is terminated quickly without an arc being drawn longer and longer until it gets so long it extinguishes itself.

Numerous modifications may be made to the present invention which still fall within the intended scope hereof. Thus, it should be apparent that there has been provided in accordance with the present invention a method and apparatus for welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding power supply comprising:

a source of power having a welding output;

a controller, connected to the source of power;

a welding output feedback circuit, connected to the controller;

wherein the controller includes a comparator connected to receive a signal indicative of a threshold and a signal responsive to the feedback circuit, and wherein the controller further includes an arc end control connected to an output of the comparator and responsive to the comparator.

2. The apparatus of claim 1, wherein the comparator is a delay comparator.

3. The apparatus of claim 1, wherein the arc end control includes at least a portion of a digital circuit.

4. The apparatus of claim 3, wherein the digital circuit includes a microprocessor with instructions that control the output of the power supply to a welding status in the event the comparator has a first output and that control the output of the power supply to an arc end status in the event the comparator has a second output for a period of time.

5. The apparatus of claim 1, wherein the feedback circuit includes a current feedback circuit.

6. The apparatus of claim 1 wherein the controller further supply comprises a second comparator disposed to receive a second signal indicative of a threshold and a second signal responsive to the feedback circuit, and wherein the controller further includes a standby/welding control connected to an output of the second comparator and responsive to the second comparator.

7. A method of providing welding power comprising:

sensing at least one output parameter;

comparing the at least one sensed parameter to a threshold including comparing an output current to the threshold; and controlling a power supply to be in a welding state or an arc end state in response to the comparison;

comparing at least one of the at least one sensed parameter to a second threshold;

and controlling the power supply to be in a standby or welding state in response to the comparison of the at least one of the at least one sensed parameters.

8. The method of claim 7, wherein controlling includes controlling the output voltage to a first level or terminating the output.

9. The method of claim 7, wherein comparing at least one of the at least one sensed parameter includes comparing an output voltage current to the second threshold.

10. A welding power supply comprising:

means for sensing an output voltage;

means for comparing the output voltage to a threshold, connected to the means for sensing; and means for controlling a power source to be in a welding or an arc end state in response to the comparison, connected to the means for comparing.

11. The apparatus of claim 10, wherein the means for controlling includes means for controlling the output to a first level or terminating the output in response to the comparison.

12. The apparatus of claim 11, wherein the means for comparing further includes means for comparing an output current to a second the threshold.

13. The apparatus of claim 12 wherein the means for controlling further comprises means for controlling the power source to be in a welding or an arc end state in response to the comparison, connected to the means for comparing.

14. A welding power supply comprising:

means for providing power;

means for controlling the means for providing power, connected to the means for providing power;

means for providing output voltage feedback, connected to the means for controlling;

wherein the means for controlling includes means for comparing a signal indicative of a threshold and a signal responsive to the means for providing output voltage feedback, and wherein the means for controlling further includes means for selecting one of a welding state and an arc end state in response to the means for comparing.

15. The apparatus of claim 14, further comprising a means for providing current feedback.

16. A method of ending a welding process comprising:

sensing an output parameter;

determining if an arc length exceeds a threshold;

controlling a power supply to be in a welding state if the arc length does not exceed the threshold; and controlling the power supply to be in an arc end state if the arc length does exceed the threshold.

17. The method of claim 16, wherein the welding state includes a first output voltage and the standby state includes terminating the output after a delay.

18. The method of claim 17, wherein determining includes comparing an output current to a threshold.

19. An apparatus for ending a welding process, comprising:

means for sensing an output parameter;

means determining if an arc length exceeds a threshold, connected to the means for sensing; and means for controlling a power supply to be in an arc end state if the arc length exceeds the threshold, connected to the means for determining.

20. The apparatus of claim 19, wherein the means for determining includes means for comparing an output current to a threshold.

21. An apparatus for starting a welding process, comprising:

an output feedback circuit;

an arc length detect circuit, responsive to the feedback circuit;

a controller, connected to the arc length detect circuit, wherein the controller includes a welding state output, provided if the arc length is less than a threshold and further includes an arc end state output, provided if the arc length is greater than the threshold.

* * * * *